OR  3,871,740

United Stat[es Patent]
Matsubara et al.

[11] 3,871,740
[45] Mar. 18, 1975

[54] BINARY CODE CONVERSION TO PRODUCE BINARY HOLOGRAMS WITH ENHANCED DIFFRACTION EFFICIENCY

[75] Inventors: Itsuo Matsubara, Kanagawa; Mitsuhito Sakaguchi, Tokyo, both of Japan

[73] Assignees: Nippon Telegraph & Telephone Public Corporation; Nippon Electric Company Limited, both of Tokyo, Japan

[22] Filed: Mar. 12, 1974

[21] Appl. No.: 450,401

[30] Foreign Application Priority Data
Mar. 14, 1973  Japan.............................. 48-28964

[52] U.S. Cl............. 350/3.5, 250/550, 340/173 LT
[51] Int. Cl. .......................................... G02b 27/00
[58] Field of Search.............. 350/3.5; 340/173 LT, 340/173 LM; 250/550

[56] References Cited
UNITED STATES PATENTS
3,572,881  3/1971  Nishida et al........................ 350/3.5
3,593,029  7/1971  Sakaguchi et al..................... 350/3.5
3,652,144  3/1972  Vander Lugt......................... 350/3.5

*Primary Examiner*—Ronald J. Stern
*Attorney, Agent, or Firm*—John M. Calimafde

[57] ABSTRACT

A method and apparatus for producing hologram memory plates containing a matrix of mini-holograms employs an array of electronically controlled light shutters for generating a mini-hologram by interference between a coherent reference ray and coherent light beams selectively passing through the shutter plurality.

In accordance with the instant invention, an input parallel binary word for controlling the transmissivity of the shutter array is selectively inverted dependent upon the frequency of incidence of a predetermined binary character in the digital input word, thereby reducing the number of exposures required to develop the hologram and increasing the signal-to-noise ratio upon readout.

2 Claims, 1 Drawing Figure

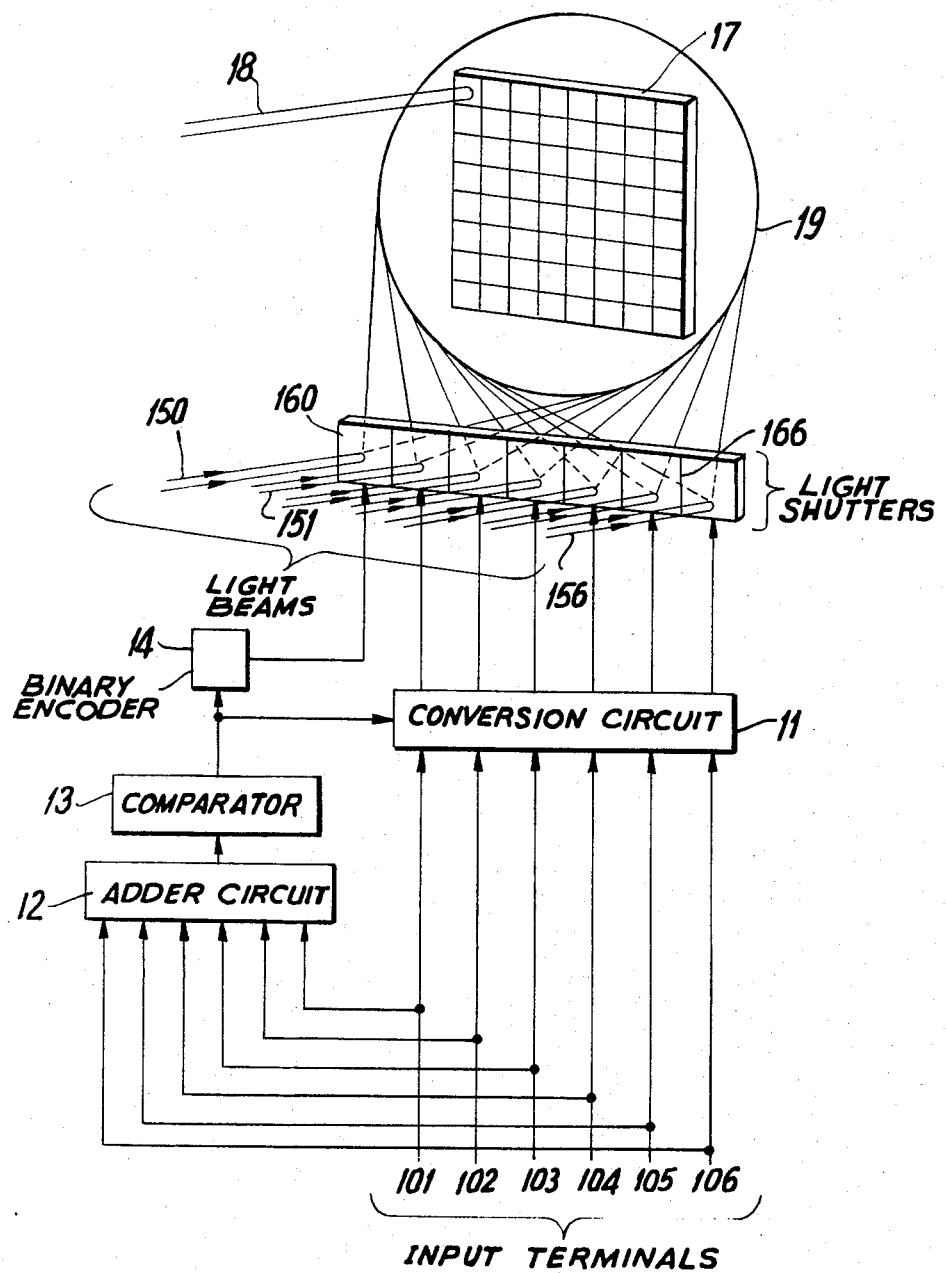

3,871,740

BINARY CODE CONVERSION TO PRODUCE BINARY HOLOGRAMS WITH ENHANCED DIFFRACTION EFFICIENCY

DISCLOSURE OF INVENTION

This invention relates to a method and apparatus for manufacturing hologram memory plates and, more particularly, to an improved method and apparatus for manufacturing hologram memory and coding plates with enhanced diffraction efficiency, requiring a smaller number of repeated exposures than in the conventional multiple exposure technique.

The inventors of the present invention disclosed in U.S. Pat. No. 3,658,402 (the disclosure of which is incorporated herein by reference) and Japanese Pat. Application Nos. 93845/70 and 93846/70 holograph tablet devices in which the X and Y coordinates of a number of small points on a plane are respectively translated into an array of binary-code representing coherent light beams and recorded on a photographic plate in the form of "mini-holograms" arranged in lines and columns. The mini-holograms are then sequentially and individually illuminated by a coherent light beam to successively produce reconstructed coherent light beam arrays which are translated back into parallel binary signals by an array of photodiodes for the reproduction of the positional data of the respective illuminated mini-holograms. Such a hologram tablet device finds application in character-and-pattern-input apparatus for computers, automatic control apparatus, digital type position control apparatus for servo systems, and the like.

Such a hologram memory plate contains a matrix of $2^m \times 2^n$ mini-holograms, each of which stores its own positional information in the form of an $(m+n)$-bit binary code, defining $2^m$ points in the $x$-axis direction and $2^n$ points in the $y$-axis direction. The illumination of the mini-holograms by a coherent light beam of an approximately equal cross sectional area in the direction perpendicular to the surface of the memory plate produces $m+n$ first-order diffraction light beams, which are then caused to irradiate an array of photodiodes and are translated back into a parallel digital signal.

As described above, the hologram coding plate comprises a dictionary for finding the binary codes of given $x$ and $y$ coordinates, and therefore all of the information to be stored is known prior to the fabrication of the hologram coding plate. By virtue of such a hologram coding plate, all of the information for the $2^m \times 2^n$ mini-holograms can be recorded by just $(m+n)$ exposures, with $m+n$ data masks replaced one by one for each specific angle of incidence for the reference light beams and those subject beams space-modulated with the data masks.

In this mini-hologram forming technique, the number of those bright spots in the real image of the data masks forming a mini-hologram which correspond to a binary digit "1", for example, varies widely from zero to $n+n$. A greater number of the bright spots requires a greater number of exposures for forming the mini-hologram. On the other hand, as the exposures increase in number, i.e., in total light value corresponding to the repeated exposures, the sensitivity of the photosensitive material constituting the memory plate deteriorates. This results in a great variation in luminance of the recorded bright spots, with a resultant non-uniformity in diffraction efficiency. It follows therefore that the signal-to-noise ratio of the readout signal as a whole is adversely affected. More specifically, it tends to be difficult to differentiate between the binary digits 1 and "0" in the readout process.

It is therefore an object of the present invention to provide a method and apparatus for fabricating hologram coding plates capable of forming a matrix of mini-holograms employing a far smaller number of exposures of the photographic material to the subject and reference light rays, thereby improving the signal-to-noise ratio of the readout.

In this invention, the image of an array of $m+n$ coordinate-representing coherent light beams is holographically recorded by the use of the multiple exposure technique on a photographic plate, in such a manner that the bright and dark spots are unaltered for those instances where the number of bright spots representative of 1, for example, is smaller than $(m+n)/2$, and that those bright and dark spots are inverted for those cases where the above-mentioned number is greater than $m+n/2$. In other words, for those $(m+n)$-bit coordinate-representing binary codes having fewer than $m+n/2$, 1 digits, the recording is performed on the basis of the "true" value of each binary digit. Conversely, for those similar codes having 1's numbering more than $m+n/2$, the recording is based on the "complementary" value of each digit.

By selectively switching from true to complementary values during recording, depending on the number of 1 or 0 digits, the difference between the maximum and minimum numbers of bright spots is reduced by half and the number of exposures is reduced.

The above and other objects and features of the present invention will become more clear from the following discussion of the instant invention, presented hereinbelow in conjunction with the drawing, which comprises a schematic diagram illustrating apparatus and a process for preparing a hologram memory plate according to this invention.

For simplicity of explanation, it is assumed here without loss of generality that the digital signal to be recorded in the form of mini-holograms comprises a 6-bit binary signal (i.e., $m+n=6$), and that the mini-holograms are sequentially and individually formed by the combination of a reference beam and a space-modulated beam array changed for each mini-hologram, rather than by the use of six data masks for effecting the multiple exposures.

In this embodiment, a 6-digit parallel binary signal representing the coordinates of each point on a plane is supplied to a true-complementary mode conversion circuit 11 and to an adder circuit 12 by way of input terminals 101–106. The adder circuit 12 is adapted to add the number of 1 digits contained in each composite input binary code word, and provides an output voltage proportional to the number of 1's counted. This output potential is then supplied to a level comparator 13. The comparator 13 has a reference voltage set at value intermediate the adder output voltages corresponding to three and four input 1 digits in an input word, and the comparator 13 supplies an output voltage only when the output voltage of the adder circuit 12 exceeds the reference voltage. The mode conversion circuit 11 effects no mode conversion (i.e., does not invert the operand input word) absent an output from the comparator 13. When the circuit 13 does provide an output potential, mode conversion (i.e., inversion) is effected upon each of the digits contained in the input digital signal. The output of the level comparator 13 is supplied to binary encoder circuitry 14 for use as an index digit as discussed below.

The 6-bit parallel output of the selective mode converter 11 and the output of the circuit 14 are fed to the control signal input electrodes (not shown) of shutters 160–166 disposed in a parallel array in the light paths of seven parallel coherent light beams 150–156. These shutters 160–166 respectively control transmission or interception of the coherent light beams 150–156 in response to the states of the binary bits delivered from the circuits 14 and 11. Accordingly, a coherent point image array, representing a 7-bit parallel digital signal, i.e., the 6-bit input digital signal (or its complement) augmented by the index bit, appears at the output of the shutter array 160–166. On the output side of the shutter array 160–166, each coherent light beam is diffused to irradiate the entire surface of a photographic plate 17.

A coherent light beam 18 having a cross sectional area approximately equal to or smaller than the area occupied by each small hologram on the photographic plate 17 is directed to the photographic plate 17 and comprises the reference light beam, the position of irradiation being varied in synchronism with the variation of the input digital signal at terminals 101–106 so that a number of mini-holograms may be recorded in a matrix form on the plate 17. For exposure of the plate 17, a shutter structure operable in synchronism with the variation in the input digital signal is employed, this shutter means not being shown in the drawing for simplicity. To prevent the photosensitive material at the undesired portions of the plate 17 from being exposed to the beams from the shutters 160–166 during the formation of a desired mini-hologram, a plate 19 containing a saturable dye may be disposed in front of the photographic plate 17. Such a plate 19 turns transparent only when irradiated by the output beams from both the shutters 160–166 and the reference light beam. The use of such a plate 19 is well known to those skilled in the art.

As will be apparent from the foregoing description, the mini-hologram forming method according to this invention statistically cuts by one half the frequency at which the number of 1 digits occurs or, in other words, the range in which the number of bright spots contained in the point image array representing the digital signal varies. As above described, this is achieved by selectively inverting the input binary signal word. Consequently, the variation in brightness of the individual bright spots contained in a reconstructed diffraction point image array can be held within a narrower range vis-a-vis a conventionally prepared holographic coding plate, with the result that the signal-to-noise ratio of the readout signal is markedly improved.

In the foregoing description, no mention has been made of the true-complementary mode conversion to be performed during readout. However, a circuit arrangement for effecting such corresponding mode conversion under control of the index bit is obvious to those skilled in the art and, accordingly, further description will not be given here.

The reduction of exposures of the photosensitive material achieved by the present hologram formation method will be more easily understood if it is assumed that the beams 150–156 are supplied sequentially rather than simultaneously in parallel. In such a case, the shutters 160–166 are scanned by a coherent light beam for every input digital word fed to the input terminals 101–106, the plate 17 thus being sequentially irradiated by the beams 150–156, with the result that exposure of the photographic material to light beams is performed repeatedly (a number of times equal to the number of 1 digits contained in the word being written in).

The smallest number of repeated exposures will now be examined for a case where the input word comprises 6 bits as in the assumed embodiment. This minimum condition corresponds to the situation where the index digit is 0 while all other digits are also being 0. It therefore follows that the exposure is repeated seven times (for the reference light beam 18 only). Similarly, the greatest number of exposures is 10, 7 times for the reference light beam 18 and 3 times for the index digit and data digits. Since the luminance of a point image in a reconstructed point image array is inversely proportional to the square of the number of exposures or the total exposure light value, the ratio of the luminance variation among the spot image array for a mini-hologram involving the greatest number of exposures to the corresponding luminance variation for another mini-hologram involving the smallest number of exposures is given by:

$(10/7)^2 \approx 2$.

The corresponding ratio for a holographic memory plate prepared by the conventional prior art method is given by $(12/6)^2 = 4$.

It will therefore be apparent that a reduction in the total amount of exposure and a resultant improvement in diffraction efficiency are achieved employing the principles of the instant invention, realizing the one-half reduction in luminance variation and the improved signal-to-noise ratio.

The above described arrangement is merely illustrative of the principles of the present invention. Numerous modifications and adapatations thereof will be readily apparent to those skilled in the art without departing from the spirit and scope of the present invention.

What is claimed is:

1. An arrangement for manufacturing a holographic memory plate with a number of mini-holograms recorded thereon in lines and columns, each mini-hologram being formed by the interference of a coherent reference beam and plural information-bearing coherent light beams, comprising:

a plurality of input terminals for receiving binary signals supplied in a parallel word-by-word fashion, means for counting for each binary signal word the number of those digits which are in a predetermined one of the two binary states, means responsive to the binary state digit counting means for providing a control signal when the number exceeds one half of the binary digits of each said word, means coupled with said input terminals and responsive to said control signal supplied thereto by said control signal providing means for selectively inverting the states of said binary digits, means for converting said control signal into a binary digit, means for generating a plurality of parallel coherent light beams equal in number to the number of binary digits in each word plus one for the control signal binary digit, shutter means disposed in the light paths of said parallel coherent beams for controlling the passage of light therethrough such that each of said parallel coherent beams is selectively blocked or passed in response to the state of a different one of said binary digits provided by the output of said selective inverting means and said converting means, a photographic plate disposed to be irradiated by said light beams transmitted through said shutter means, and means for irradiating said photographic plate simultaneously with a reference beam to form interference patterns with the output beams from said shutter means to form one mini-hologram on said photographic plate.

2. A method of manufacturing a holographic memory plate with a number of mini-holograms recorded thereon in lines and columns, each mini-hologram being formed by the interference of a coherent reference beam and plural information-bearing coherent light beams, comprising the steps of:

receiving binary signals organized in a parallel word-by-word fashion, counting for each word the number of those digits which are in a predetermined binary state, inverting the binary states of the digits of a binary word when the number of predetermined binary states counted exceeds one half of the total number of binary digits contained in a word and generating an additional binary index bit defining whether or not the binary word has been inverted, directing toward a photographic plate a plurality of coherent light beams equal in number to the number of binary digits in each word plus one for the index bit, selectively blocking each of said beams in response to one state of a different one of said bianry digits and bit as inverted or not by said inverting step, and simultaneously therewith, irradiating said plate with a coherent reference light beam to form interference patterns constituting one mini-hologram.

* * * * *